United States Patent
Whisson

[19]

[11] Patent Number: 6,159,321
[45] Date of Patent: Dec. 12, 2000

[54] CENTRIFUGATION SUPPORT

[75] Inventor: Maxwell Edmund Whisson, Perth, Australia

[73] Assignee: Australian Red Cross Society (Western Australian Division), Perth, Australia

[21] Appl. No.: 09/142,843

[22] PCT Filed: Mar. 20, 1997

[86] PCT No.: PCT/AU97/00184

§ 371 Date: Sep. 16, 1998

§ 102(e) Date: Sep. 16, 1998

[87] PCT Pub. No.: WO97/34704

PCT Pub. Date: Sep. 25, 1997

[30] Foreign Application Priority Data

Mar. 21, 1996 [AU] Australia .................................. PN8833

[51] Int. Cl.⁷ .................................................. B29C 53/36
[52] U.S. Cl. .................. 156/217; 156/306.3; 156/308.2; 248/311.2
[58] Field of Search ..................................... 156/216, 217, 156/218, 224, 284, 289, 306.3, 308.2; 210/516; 248/311.2; 494/20, 21, 45

[56] References Cited

U.S. PATENT DOCUMENTS

| 2,679,969 | 6/1954 | Richter | 156/306.3 |
| 4,447,220 | 5/1984 | Eberle | 494/26 |
| 4,892,668 | 1/1990 | Harmony et al. | 210/782 |
| 5,456,845 | 10/1995 | Nishimura et al. | 210/782 |
| 5,489,386 | 2/1996 | Saunders | 210/514 |
| 5,549,540 | 8/1996 | Moore et al. | 494/20 |

FOREIGN PATENT DOCUMENTS

| 31 26410 A1 | 2/1983 | Germany | B04B 5/04 |
| 1 407 825 | 9/1975 | United Kingdom | B04B 7/00 |

OTHER PUBLICATIONS

Sears et al.; Technology of Plasticizers, pp. 460–462.

*Primary Examiner*—Michael W. Ball
*Assistant Examiner*—Jessica Rossi
*Attorney, Agent, or Firm*—Merchant & Gould P.C.

[57] ABSTRACT

A centrifugation support for a receptacle (15) where the support comprises a strip (11) formed of a flexible plastics material, the strip (11) having a width corresponding to a substantial portion of the height of the receptacle (15) and a length sufficient to be wrapped around the receptacle (15) with the end portions (13 and 14) overlapping, wherein the overlapping surfaces of the end portions (13 and 14) which abut each other when the strip (11) is wrapped around the receptacle (15) have a blocking characteristic and the remainder of the surface of the strip (11) is substantially tack free.

16 Claims, 3 Drawing Sheets

CENTRIFUGATION SUPPORT

FIELD

The present invention relates to a centrifugation support which can be used in association with receptacles which are intended for centrifugation such as storage bags, bottles and vials, during centrifugation.

BACKGROUND

The invention has particular application to use with receptacles containing blood which is to be processed. In a blood donation program, blood from each individual is received and stored in a separate storage bag for subsequent use and processing. It is important that blood which is so collected, remain separate from other donations and that the components which are extracted from the donated blood are also maintained separate to prevent contamination and to facilitate identification of the blood and its components with the donor. As a result it is usual that blood is collected in a flexible storage bag which may in many cases be associated with a number of interconnected bags. Subsequent to collection the initial storage bag which is substantially full at the completion of a donation can be subjected to centrifugation in order to provide two phases comprising one phase which is rich in red blood cells and a second phase which essentially comprises plasma which is rich in platelets. The plasma is then transferred from the first storage bag into an associated second storage bag. The two phases which have thus been separated may then be used or alternatively may be subjected to further centrifugation to facilitate further separation of additional components.

There is a difficulty however that is created in the further centrifugation of the two storage bags which is as a result of the circumstance that both of the storage bags are only partially filled. It has been found that when a partially filled storage bag is located in the bucket of a centrifuge, the gravitational forces which are induced by centrifugation, cause the bag to collapse into the bottom of the bucket and as a result of such collapse there is an inadequate separation of the phases of the blood products within the storage bag. This is because some of the contents of the storage bag are received in the folds and wrinkles which are induced in the bag as a result of its collapse into the bottom of the bucket of the centrifuge and the presence of the folds and wrinkles can inhibit the creation of a clear line of separation of the phases. Furthermore if a clear line of separation is created, it is difficult to maintain that line of separation on removal of the bag from the bucket.

In the past one method which has been proposed to overcome this difficulty has comprised inserting a partition into the centrifuge bucket which subdivides the space within the bucket into two or more zones and then inserting the partially filled storage bags into each of the zones whereby the partition and walls of the bucket tend to provide some support for the wall of the storage reservoir. It has been found however that as a result of the intense gravitational forces which result from centrifugation, the bags tend to migrate across the floor of the bucket and underneath the partition. This migration results in the creation of folds and wrinkles which inhibit the separation of the contents of the storage bag into its components as discussed above. In addition such migration can cause rupturing of the bags as a result of the partition being forced against a portion of the bag migrating underneath it.

Furthermore when it is necessary to centrifuge bottles or vials it has been found that the intense gravitational forces resulting from the centrifugation can cause the bottles or vials to burst. In addition if the bottles or vials are not snugly received in the bucket of the centrifuge as is the case with sample bottles or vials which are loosely received in the bucket the bottles or vials are more likely to suffer from deformation or breakage.

SUMMARY

It is an object of this invention to provide a means which is capable of supporting a receptacle during centrifugation.

Accordingly the invention resides in a centrifugation support for a receptacle where said support comprises a strip formed of a flexible plastics material, said strip having a width corresponding to a substantial portion of the height of the receptacle and a length sufficient to be wrapped around the receptacle with the end portions overlapping, wherein the overlapping surfaces of the end portions which abut each other when the strip is wrapped around the receptacle have a blocking characteristic and the remainder of the surface of the strip is substantially tack free.

It is a characteristic of plastic sheeting that the surface of the plastics sheeting can have properties known as a "blocking action" and "tack". Blocking is the adhesion which is created between the touching layers of plastic, which are usually of the same material, such as that which may develop under pressure during storage or use. There are various methods of measuring blocking action. According to one method, two sheets may be pressed together at a given pressure for a standard time and then pulled apart in a tensile test apparatus to measure the force required for separation in grams per square centimeter or by the peel test ASTM1893-67 with results in a measure which is in grams per millimeter of specimen width. In this regard a simple grading technique has been proposed in the reference: "The Technology of Plasticizers" by J. Kern and Joseph R. Darby and published by Wyley & Sons at pages 460 to 461; which is as follows:

1) no blocking: films or sheets slide over each other easily;
2) very slight blocking: finger pressure is needed to promote sliding;
3) slight blocking: sheets must be pulled apart, but surfaces are not marred;
4) moderate blocking: sheets must be pulled apart and the surfaces are marred;
5) severe blocking: sheets cannot be pulled apart.

In the formulation of plastic sheeting, anti blocking agents may be added to the formulations in the manufacture of the plastic sheeting or alternatively the surface of the finished product can be treated by application of a coating of some form to the surfaces to render the surfaces non blocking and tack free. According to an alternative embodiment the material is inherently tack free and is treated in the relevant areas to provide the slight blocking action. Such treatment may comprise the application of a coating to the relevant areas or the chemical treatment of the relevant areas.

In the present invention the adhesion resulting from the blocking characteristics of the overlapping surfaces of the end portions of the strip serve to provide support for the centrifugal support to allow the support to maintain its encompassing supporting relationship with the receptacle. Whilst being subjected to the intense gravitational forces which will result from centrifugation.

Another property of plastics material comprises the property of "tack" which is generally defined in the abovementioned reference, at pages 461 to 462, as the stickiness of a plastic material which is measurable as the force required to separate an adherent from it. This property is essentially like the blocking action except that two dissimilar surfaces are usually involved.

It is a desirable characteristic of the centrifugal support of the present invention that the portions of the strip which are in contact with the receptacle and with the surface of the bucket of the centrifuge do not adhere to the receptacle and the bucket. This facilitates the insertion of the receptacle into the bucket when wrapped in the centrifugal support and the non-destructive separation of the is centrifugal support from the receptacle on completion of the centrifugation.

The tack free property of the portions of the strip which are intended to be in contact other surfaces can be effected in the formulation of the composition of which the strip is formed or by coating the appropriate portion of the strip. The coating may be effected by printing, or by application of a suitable powder such as talc, or alternatively by application of a suitable film such as "Teflon".

According to a further preferred feature of the invention the strip is substantially transparent.

According to a further preferred feature of the invention the strip bears printed instructions indicating the manner of use of the strip. According to one embodiment the blocked surfaces are identified by suitable indicia.

In another form the invention resides in a method of preparing a receptacle for centrifugation comprising wrapping the receptacle with a centrifugation support of the form as described above whereby the end portions are caused to overlap with the overlapping surfaces abutting each other.

According to a preferred feature of the invention the receptacle comprises a flexible blood storage bag.

According to a preferred feature of the invention the receptacle comprises a bottle.

According to a preferred feature of the invention the receptacle comprises a plurality of bottles.

According to a preferred feature of the invention the receptacle comprises a vial.

According to a preferred feature of the invention the receptacle comprises a plurality of vials.

BRIEF DESCRIPTION OF THE DRAWINGS

The invention will be more fully understood in the light of the following description of several specific embodiments. The description is made with reference to the accompanying drawings which comprise.

DETAILED DESCRIPTION

The first embodiment is directed to a centrifugation support which is to be used in supporting a partially filled blood storage bag during centrifugation. The support comprises a strip 11 formed of a flexible PVC material which: is transparent; is substantially non-extensible; and is provided with sufficient rigidity to be substantially self supporting under its own weight. An example of the PVC material comprises one being of a flexible grade and having a thickness of approximately one millimeter.

The strip 11 has a width substantially corresponding to the height of a blood storage bag and has a length which is approximately 3 times the width of the blood storage bag. The strip 11 comprises generally three zones which consist of a central portion 12 and end portions 13 and 14. Each of the portions are of a length of approximately one third of the length of the strip 11. The length of the strip 11 is such that the strip is able to be wrapped around a partially filled blood storage bag with the end portions 13 and 14 overlapping in order that the bag is substantially fully accommodated within the encircling strip 11.

It is a feature of the embodiment that in the formation of the strip 11, the overlapping surfaces (the "blocked surfaces") of the end portions 13 and 14 are treated such that they have a slight blocking action (as defined above) but the remainder of the surface of the strip 11 is substantially tack free. According to the first embodiment, the tack free nature of the remainder of the surface of the strip is obtained from a strip of material having a slight blocking action over its whole surface. The creation of the tack free surface is effected by application of a coating over the remainder of the surface of the strip to leave only the blocked surfaces with the blocking Property. In the case of the first embodiment the application of the coating comprises the printing of a layer of material onto the remainder of the surface. Alternatively the coating may be effected by the application of a powder over the remainder of the surface, or by applying a film onto the remainder of the surface.

Figure 1:
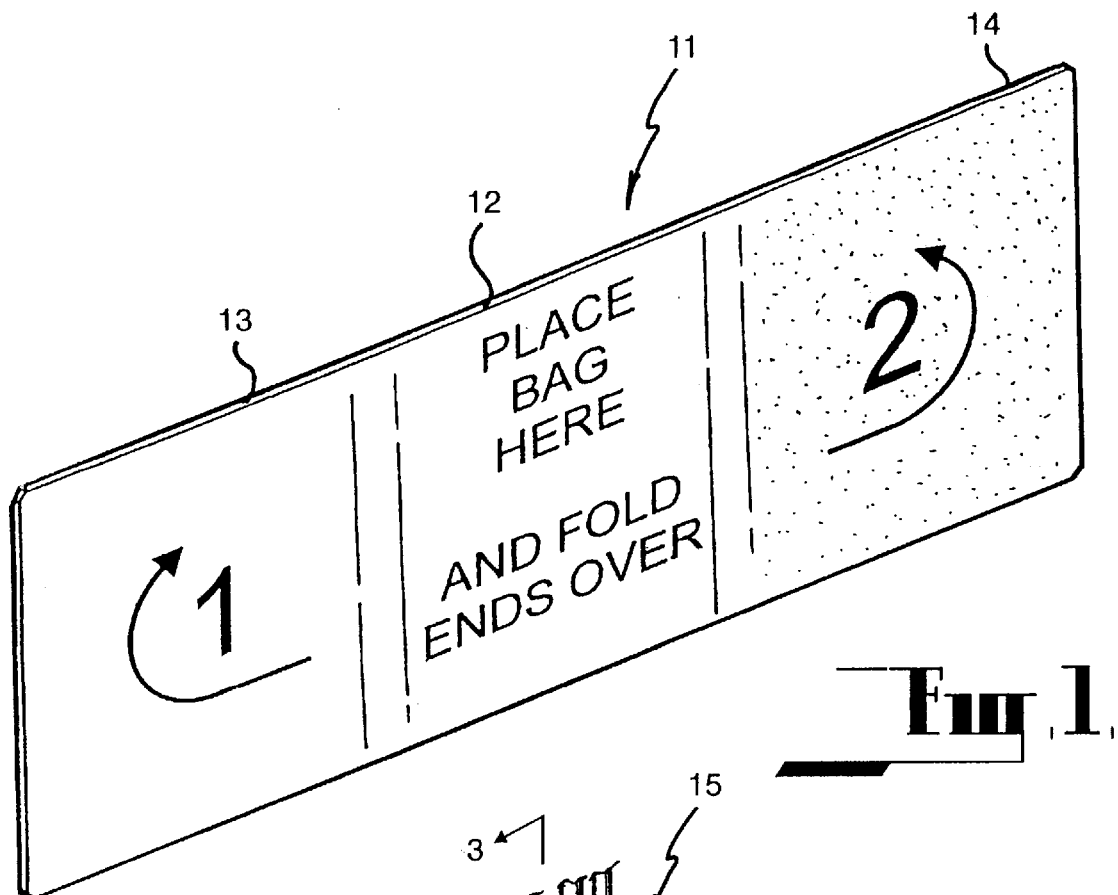
FIG. 1 is an isometric view of the centrifugation support according to the first embodiment.

In addition as shown in FIG. 1 the strip 11 bears suitable indicia or labels which are formed into the surface or printed onto the surface of the strip and which provide an indication of the manner in which the strip is to be applied to a storage bag and the location of the blocked surfaces.

Figure 2:
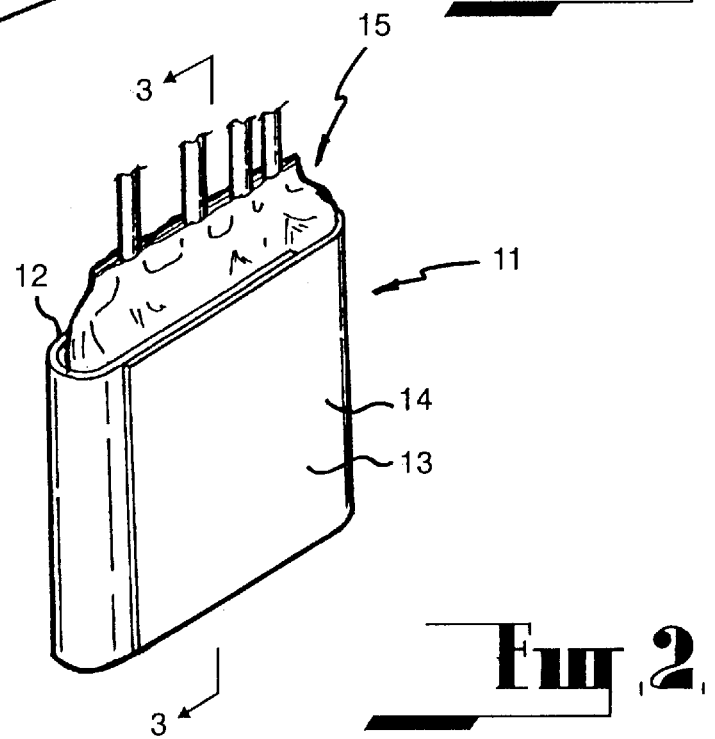
FIG. 2 is an isometric view of the centrifugation support of the first embodiment applied to a blood storage bag.
Figure 3:
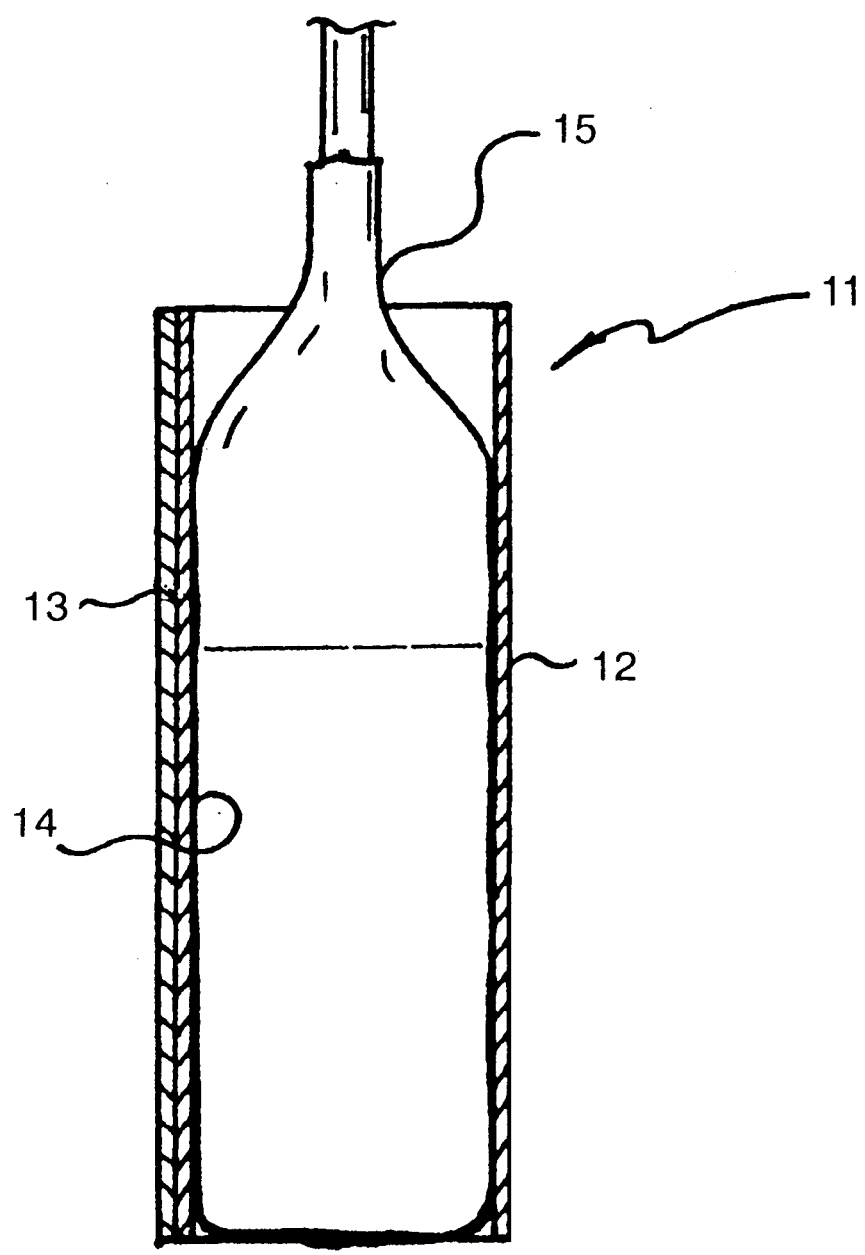
FIG. 3 a sectional elevation along line 3—3 of FIG. 2.

The presence of the slight blocking action on the blocked surfaces of the end portions 13 and 14 ensures that when the strip is wrapped around a blood storage bag 15 as shown at FIGS. 2 and 3 the blocked surfaces will adhere to each other with sufficient force that they will not separate during centrifugation. As a result the blood storage bag is supported against its collapse during centrifugation and is held in a substantially upright shape within the blood centrifugation support. The formation of the remainder of the surface of the strip 11 such that it is tack free serves to prevent adhesion between centrifugation support and the walls of the bag and between centrifugation support and the internal surface of the bucket of the centrifuge. This facilitates the insertion and subsequent removal of the blood bag from the centrifugation support without damage to the walls of the bag or the impairment of the visibility of the label carried by the bag since the tack free property of the surface ensures that there is little or no adhesion between the surfaces of the blood storage bag and the centrifugation support and in particular with any printing or labels carried by the blood storage bag. As a result the removal of the centrifugation support from the storage bag will not lift any print from the labels or lift the labels from the storage bag.

It is a preferred feature of the embodiment that the edges of the strip are not sharp and if possible that they be rounded.

In addition the tack free property of the centrifugation support enables the centrifugation support and bag to be inserted into the bucket of the centrifuge and then be removed from the bucket at the conclusion of the centrifugation without the centrifugation support sticking to the walls of the bucket.

The transparent nature of the centrifugation support enables the label on the storage bag to be read and thus its status identified, even when the storage bag is accommodated by the centrifugation support.

In addition the transparent nature of the centrifugation support enables the boundary between the phases within the centrifuged bag to be seen while the bag is accommodated within the centrifugation support. This enables the upper phase to be displaced out of the bag at the conclusion of the centrifugation, without the need to initially remove the centrifugation support, since such removal may disrupt the boundary and thus reduce the degree of separation that would otherwise be possible.

In use the centrifugation support is laid out on a bench or like surface. The partially filled blood storage bag is then located on the central portion 12 of the centrifugation support and the end portions 14 are wrapped around the blood storage bag such that the blocked surfaces overlap in an abutting relationship and that the blood storage bag is tightly contained by the centrifugation support. On completion of centrifugation the centrifugation support and the contained blood storage bag can then be transferred to an appropriate support to facilitate the decantation or transfer of the upper phase of the contents of the storage bag from the lower phase.

The flexible nature of the strip material of which the centrifugation support is formed facilitates the controlled compression of the storage bag within the centrifugation support to facilitate the controlled decantation or transfer of some of the contents of the storage bag after centrifugation without the need to remove the centrifugation support. In addition as stated previously the transparent nature of the centrifugation support enables the boundary between the phases to be seen during such transfer or decantation.

Figure 4:
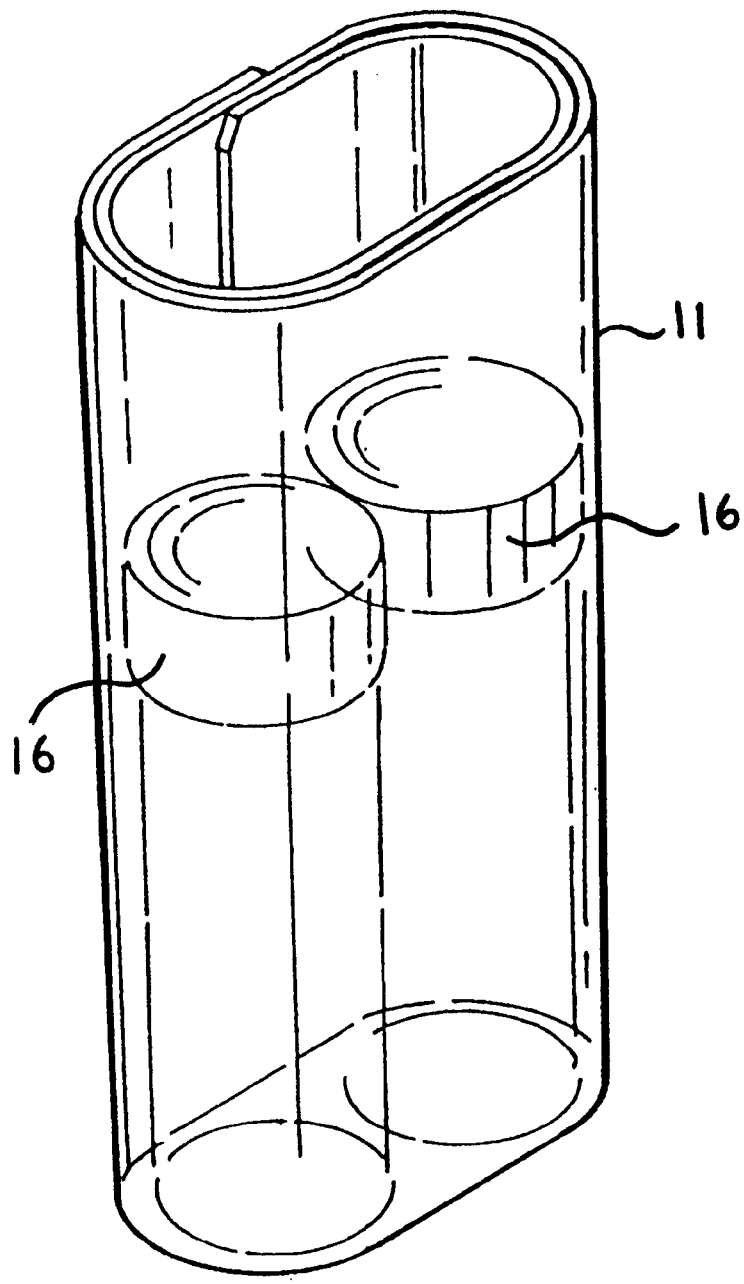
FIG. 4 is an isometric view of the first embodiment applied to a pair of sample vials.

The centrifugation support of the first embodiment can be used in association with rigid bottles or vials which are used to collect blood samples. It is not uncommon for such bottles or vials, which can be formed of glass or plastic, to rupture when subjected to centrifugation or in the case of plastic bottles or vials to deform which may cause them to become jammed in the centrifuge bucket, when subjected to centrifugation. In addition in many instances a number of bottles or vials are loaded into a bucket to be centrifuged together and it becomes necessary to provide packing which will prevent movement of the bottles or vials in the bucket. As shown at FIG. 4 the strip 11 of the first embodiment can be applied around a number of sample vials 16 prior to them being placed in the centrifuge in the same manner as has been described above in relation to blood storage bags. The strip 11 serves to hold the sample vials 16 firmly together and to provide further support to the side walls of the sample vials 16 to resist deformation during centrifugation.

According to a second embodiment the centrifugation support of the first embodiment is varied in that the sides of the end portions are formed to be slightly convergent towards the respective end. As a result of trials, it has been found that this configuration of the end portions assists in preventing the migration of the wall of the storage bag between the overlapping portions when the bag and support are subjected to centrifugation. There is a danger that such migration will cause the bag to be ruptured during centrifugation.

A third embodiment comprises forming the side edges of the end portions of the first or second embodiments such that they are convoluted or serrated. This configuration also assists in preventing the migration of the wall of the bag between the overlapping end portions during centrifugation.

According to an alternative embodiment in the manufacture of the strip 11 the tack free property of the remainder of the surface is effected to be an inherent property of the strip while the slight blocking action is an inherent property of the blocked surfaces.

According to another alternative embodiment the strip is formed of a material which is inherently tack free and which is treated in the areas of the blocked surfaces to provide the slight blocking action. Such treatment may comprise the application of a coating to the relevant surfaces or the chemical treatment of the relevant surfaces.

It should be appreciated that the scope of the present invention need not be limited to the particular scope of the embodiments described above.

I claim:

1. In a centrifugation support for a receptacle where said device, a support comprises a strip formed of a flexible plastics material, said strip having two opposed, free side edges and two opposed end edges, said strip having end portions that include said end egdes, and said strip having a length between the two opposed end edges that is greater than a circumference of the receptacle whereby the strip is able to be wrapped around the receptacle with surfaces of the end portions overlapping, wherein the overlapping surfaces of the end portions which will abut each other when the strip is so wrapped around the receptacle have a blocking characteristic and the remainder of the surface of the strip is tack free, and wherein when the strip is wrapped around the receptacle the resulting structure formed by the strip is open at its bottom.

2. A centrifugation support as claimed in claim 1 wherein the strip is transparent.

3. A centrifugation support as claimed in claim 1 wherein the strip bears printed instructions indicating the manner of use of the strip.

4. A centrifugation support as claimed in claim 2 wherein the blocked surfaces are identified by indicia.

5. A centrifugation support as claimed in claim 1 wherein the receptacle comprises a flexible blood storage bag.

6. A centrifugation support as claimed in claim 1 wherein the receptacle comprises a bottle.

7. A centrifugation support as claimed in claim 1 wherein the receptacle comprises a plurality of bottles.

8. A centrifugation support as claimed in claim 1 wherein the receptacle comprises a vial.

9. A centrifugation support as claimed in claim 1 wherein the receptacle comprises a plurality of vials.

10. A centrifugation support as claimed in claim 1 wherein the receptacle contains blood.

11. A centrifugation support as claimed in claim 1 wherein the edges of the strip are not sharp.

12. A centrifugation support as claimed in claim 11 wherein the edges of the strip are rounded.

13. A centrifugation support as claimed in claim 1 wherein the edges of the strip are formed such that they are convoluted or serrated.

14. In a method of centrifuging, a method of preparing a receptacle for centrifugation comprising wrapping the receptacle with a centrifugation support comprising a strip formed of a flexible plastics material having end portions, said strip having a length that is greater than a circumference of the receptacle whereby the strip is able to be wrapped around the receptacle with surfaces of the end portions overlapping, and wherein when the strip is wrapped around the receptacle the resulting structure formed by the strip is open at its bottom.

15. In a centrifugation device, a support for a receptacle where said support comprises a strip formed of a flexible plastics material, said strip having end portions, and said strip having a length that is greater than a circumference of the receptacle whereby the strip is able to be wrapped around the receptacle with surfaces of the end portions overlapping, wherein the overlapping surfaces of the end portions which will abut each other when the strip is so wrapped around the receptacle have a blocking characteristic and the remainder of the surface of the strip is tack free, and wherein the strip does not support a bottom surface of the receptacle.

16. In a centrifugation device, a support for a receptacle where said support comprises a strip formed of a flexible plastics material, said strip having end portions, and said strip having a length that is greater than a circumference of the receptacle whereby the strip is able to be wrapped around the receptacle with surfaces of the end portions overlapping, wherein the overlapping surfaces of the end portions which will abut each other when the strip is so wrapped around the receptacle have a blocking characteristic and the remainder of the surface of the strip is tack free, and wherein when the strip is wrapped around the receptacle the resulting structure formed by the strip is open at its bottom.

* * * * *

UNITED STATES PATENT AND TRADEMARK OFFICE
CERTIFICATE OF CORRECTION

PATENT NO. : 6,159,321
DATED : December 12, 2000
INVENTOR(S) : Whisson

It is certified that error appears in the above-identified patent and that said Letters Patent is hereby corrected as shown below:

<u>Column 6,</u>
Line 13, insert -- device, a -- after "centrifugation"
Line 14, delete "device, a"
Line 17, "egdes" should be -- edges --

Signed and Sealed this

Seventh Day of May, 2002

Attest:

JAMES E. ROGAN
*Attesting Officer*    *Director of the United States Patent and Trademark Office*